United States Patent [19]
Oogi

[11] Patent Number: 4,824,044
[45] Date of Patent: Apr. 25, 1989

[54] TAPE CASSETTE

[75] Inventor: Takashi Oogi, Miyagi, Japan

[73] Assignee: Sony Corporation, Tokyo, Japan

[21] Appl. No.: 149,504

[22] Filed: Jan. 28, 1988

[30] Foreign Application Priority Data

Feb. 10, 1987 [JP] Japan .................................. 62-17228

[51] Int. Cl.⁴ ........................................ G11B 23/087
[52] U.S. Cl. ................................................ 242/198
[58] Field of Search .............................. 242/197–200; 360/132

[56] References Cited

U.S. PATENT DOCUMENTS 4,556,153 12/1985 Takagi et al. ................... 242/198 X
4,698,713 10/1987 Kawada ........................... 242/198 X Primary Examiner—David Werner
Attorney, Agent, or Firm—Lewis H. Eslinger

[57] ABSTRACT

The present invention provides a tape cassette used as a recording medium for the recording and/or reproducing apparatus, such as a tape recorder. The tape cassette includes a lid for protecting the tape during the time the tape cassette is not used and a lock lever for locking the lid in a closed state. According to the present invention, the abutting portion on the lock lever on which abuts the release pin of the aforementioned recording and/or reproducing apparatus which is adapted for releasing the lock of the lock lever, is inclined with respect to the moving direction of the release pin, so that, when the release pin undergoes positional deviation in a direction orthogonal to its moving direction, the lock lever may be at a predetermined position when the lock lever is released, so as to prevent the lock lever from contacting with the tape in the tape cassette due to the aforementioned positional deviation of the release pin to assure the running stability of the tape.

6 Claims, 5 Drawing Sheets

TAPE CASSETTE

BACKGROUND OF THE INVENTION

1. Field of the Invention

This invention relates to a tape cassette used as a recording medium for a video tape recorder, for example, and more particularly, to a lock lever adapted for locking a lid mounted rotatably to the front side of the cassette in the closed state.

2. Description of the Prior Art

In a conventional tape cassette used as the recording medium for a recording and/or reproducing apparatus, such as a video tape recorder, a front cover or lid is rotatably mounted to cover the front side of a cassette in which a pair of tape reels about the outer periphery of which a tape is wound is rotatably supported and accommodated. This lid covers the front side of the cassette to protect the tape extending on this front side. The lid has an attachment piece provided with an engaging aperture and is adapted to be locked in the closed state by a locking lever that is provided in the tape cassette and that engages in the engaging aperture in the closed state of the lid.

As shown in FIG. 1, the lock mechanism for locking the lid in the closed state includes the aforementioned lock lever 103 rotatably supported by a supporting shaft 102 projectingly mounted from a base plate at the front side corner of the lower cassette half 101 and a torsion coil spring 104 adapted for biasing the lock lever 103 so as to be turned towards the outer side of the lower half 101. The lock lever 103 of the lock mechanism has a lateral engaging portion 105 projectingly mounted to one lateral side of the foremost part thereof and an upright engaging portion 107 at the mid part thereof engaged by one end 106 of the torsion coil spring 104. The torsion coil spring 104 has its coil portion 108 engaged with the foremost part of a supporting shaft 109 projectingly mounted adjacent to the supporting shaft 102. The one end 106 of the coil spring 104 is engaged with the upright engaging portion 107 so that the lock lever 103 is urged to be turned in a direction in which the lateral engaging portion 105 is inserted into and engaged with a lock lever aperture 110 bored in the side wall of the lower cassette half 101 so as to be projected out of the lower cassette half 101. The arrangement is so made that the portion of the lateral engaging portion 105 projecting out of the lower cassette half 101 is inserted into and engaged with an engaging aperture formed in the attachment member of the lid when the latter is in the closed state.

When the tape cassette is mounted to the recording and/or reproducing apparatus, a release pin 50 provided to the recording and/or reproducing apparatus is intruded into the cassette 112 through a release opening 111 formed in the lower cassette half 101 adjacent to the lock lever aperture 110 to thrust an abutment portion 113 formed on the surface at the mid portion of the lock lever 103 facing to the lateral wall of the lower cassette half 101 to turn the lock lever 103 inwardly of the tape cassette 112 against the biasing force of the torsion coil spring 104 for receding the lateral engaging portion 105 into the inside of the tape cassette 112. As a result thereof, the engagement between the engaging portion 105 and an engaging aperture 115 in the lid 114 is released to permit rotation of the lid 114. The latter is caused to be turned and opened by a lid opening and closing device provided to the recording and/or reproducing apparatus so that the tape extending on the front side of the tape cassette is exposed.

In the above state, it becomes possible to draw out the tape 116 from the front side of the cassette towards the recording and/or reproducing apparatus by the operation of the apparatus to permit the operation of the recording and/or reproduction.

Heretofore, owing to the mounting tolerance of the lock lever 103 and the molding error of the tape cassette 112, the abutment position of the release pin 50 on the lock lever 103 occasionally was not constant. That is, the distance between the release pin 50 and the supporting shaft 102 in a direction orthogonal to the direction of movement of the release pin 50 or the direction shown by the arrow mar A indicated in FIG. 2, that is, the distance x in FIG. 2, will differ from cassette to cassette, such that, when the release pin 50 has completed the unlocking or release operation, that is, when the release pin 50 has completed the movement over the predetermined distance or stroke, the lock lever 103 may have been turned a widely variable angle. When the distance between the release pin 50 and the supporting shaft 102 at the time of completion of the above described release operation becomes shorter than a predetermined value, the lock lever 103 may have been turned a distance larger than a predetermined distance, such that, as shown in FIG. 2, the foremost part of the lock lever 103 facing to the tape 116 may be contacted with the tape 116. When the tape reel is caused to be turned in this state to cause the running of the tape 116, the later undergoes friction at the contact portion with the lock lever 103. In such case, the stable running of the tape may be obstructed or the tape may be damaged at the contact portion resulting in the deterioration of the recording and reproducing characteristics of the tape 116 or worsening its recording and record keeping properties.

OBJECTS AND SUMMARY OF THE INVENTION

It is therefore an object of the present invention to provide a tape cassette in which, even when the release pin and the supporting shaft supporting the lock lever undergo relative positional deviation in a direction orthogonal to the direction of movement of the release pin, the unlock lever may be set at a predetermined position in the release state of the lock lever, so as to prevent the lock lever from contacting with the tape at all times to assure the running stability and prolonged shelf life of the tape.

Stated differently/ the present invention provides a tape cassette used as the recording medium for the recording and/or reproducing apparatus, such as the tape recorder. The tape cassette has a lid for protecting the tape during the time the tape cassette is not used and a lock lever for locking the lid in the closed state. According to the present invention, the abutting portion provided to the lock lever on which abuts the release pin of the aforementioned recording and/or reproducing apparatus adapted for releasing the lock of the lock lever is inclined with respect to the moving direction of the release pin, so that, when the release pin undergoes positional deviation in a direction orthogonal to its moving direction, the lock lever may be at a predetermined position when the lock lever is released, so as to prevent the lock lever from contacting with the tape in the tape cassette due to the aforementioned positional deviation of the release pin to assure the running stability of the tape.

Other objects and advantages of the invention will be apparent in the following description, the appending claims and the accompanying drawings.

DESCRIPTION OF A PREFERRED EMBODIMENT

Figure 1:
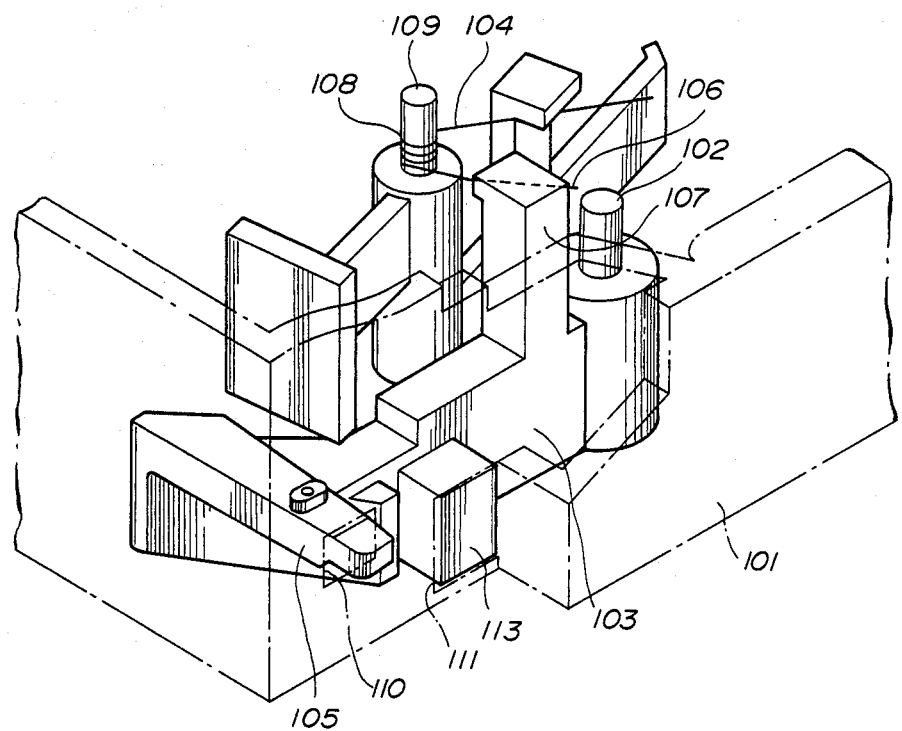
FIG. 1 is a perspective view showing essential parts of a lock lever of the conventional tape cassette employed in, for example, a tape recorder.
Figure 2:
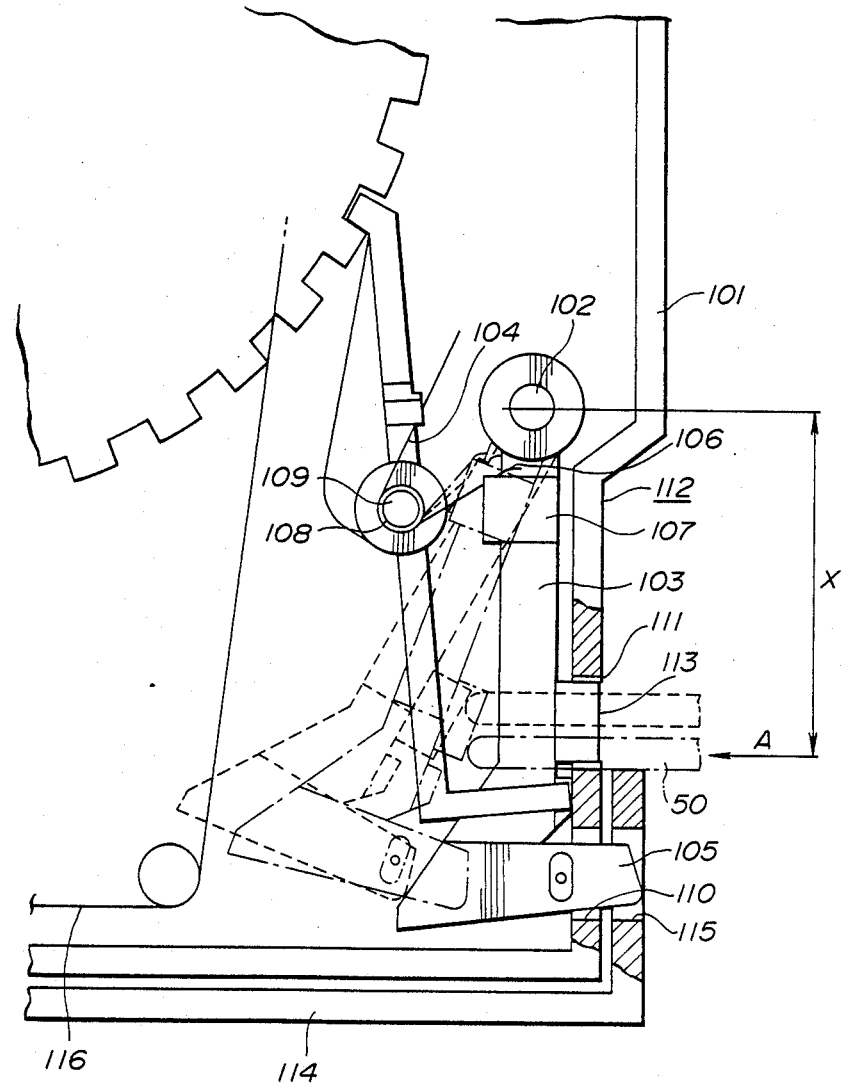
FIG. 2 is a plan view showing essential parts of the lock lever of the conventional tape cassette, partly shown in section.
Figure 3:
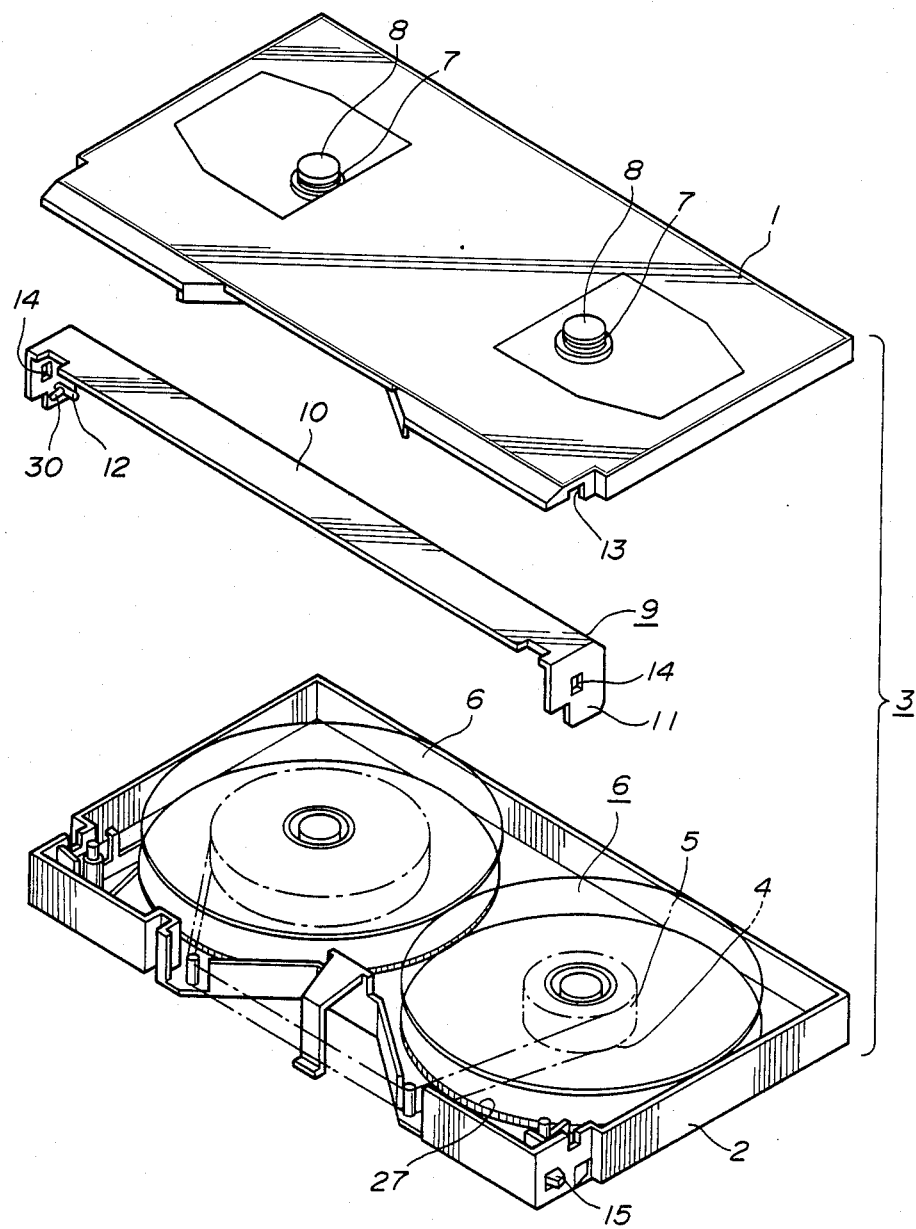
FIG. 3 is a perspective view showing the arrangement of the tape cassette of the present invention.

As shown in FIG. 3, the tape cassette according to the present invention is comprised of a cassette 3 consisting of an upper cassette half 1 and a lower cassette half 2 abutted and connected to each other. In the inside of the cassette 3, there are rotatably fulcrumed a pair of tape reels 6, 6 having an opening 4 in which a reel drive shaft of the recording and/or reproducing apparatus, such as a tape recorder, not shown, is inserted and engaged from one side. A tape 5 is wound about the periphery of these tape reels 6, 6. The upper cassette half 1 is provided with a pair of reel retainers 8, 8 supported vertically movably and acted on by biasing means 7, 7 so as to be biased in the direction of the tape reels 6, 6. These reel retainers 8, 8 act on the closed other end faces of the tape reels 6, 6 under the biasing force of the biasing means 7, 7 so that the tape reels 6, 6 are thrusted towards and supported by the lower cassette half 2.

Figure 4:
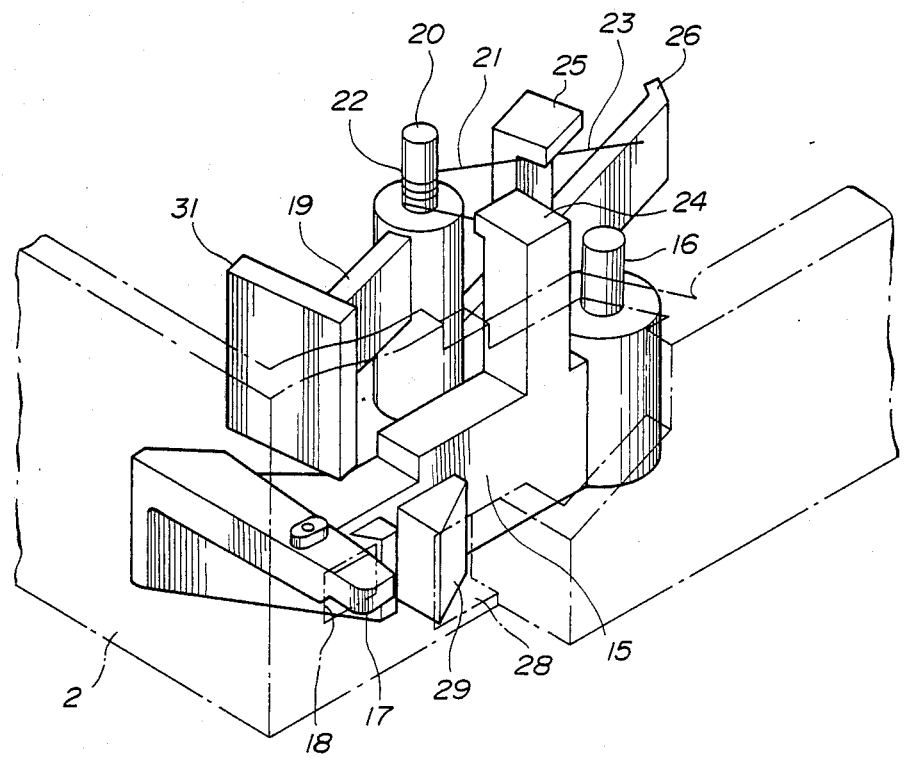
FIG. 4 is a perspective view showing essential parts of the lock lever of the tape cassette according to the present invention.

A lid 9 is provided to protect a part of the tape 5 extending on the front side of the cassette 3, so that the tape 5 will be drawn out towards the recording and/or reproducing apparatus for recording and/or reproducing operations. The lid 9 is formed by a tape cover portion 10 substantially coextensive with the front face of the cassette 3 and attachment portions 11, 11 on both sides thereof, with supporting shafts 12, 12 provided to project to the inner sides of these attachment portions 11, 11. The lid 9 is rotatably supported with the supporting shafts 12, 12 being fulcrumed in supporting shaft openings 13, 13 provided at the prescribed positions of the abutting portions of the upper cassette half 1 and the lower cassette half 2. Engaging openings 14, 14 are formed in the attachment portions 11, 11 of the lid 9. The lid is locked in the closed state by a pair of lock levers 15, 15 that are engaged in the closed state with these engaging openings 14, 14. Referring to FIG. 4 for explaining one of the lock levers 15, 15, it is rotatably supported by a supporting shaft 16 projectingly mounted to one bottom surface at the inner front side corner of the lower cassette half 2, and is biased to be turned outwards by biasing means. An engaging portion 17 is projectingly mounted to one front side of the lock lever 15. The engaging portion 17 is inserted and engaged in a lock lever opening 18 in the lower cassette half 2 so as to be projected outwardly of the lower cassette half 2. The other of the lock levers 15 is provided to the other front side corner of the bottom plate of the lower cassette half 2 similarly to the above described one of the lock levers 15, 15. There are also provided a pair of reel lock levers 19, 19, one of which is explained by referring again to FIG. 4. The reel lock lever 19 is rotatably supported by a supporting shaft 20 projectingly mounted on the lower cassette half 2 adjacent to the supporting shaft 16, and is biased by biasing means in a predetermined direction. The other of the reel lock levers 19 is similarly provided to the other front side corner of the bottom plate of the lower cassette half 2. One of torsion coil springs 21, 21 as the aforementioned biasing means is explained by referring again to FIG. 4. The torsion coil spring 21 has its coil portion 22 engaged with the foremost part of the supporting shaft 20 and its arms or end parts 23, 23 engaged with an engaging pawl 24 projectingly mounted to the mid portion of the lock lever 15 integrally therewith and with an engaging portion 25 projectingly mounted to the mid portion of the reel lock lever 19 integrally therewith, in such a manner that the lock lever 15 is biased to be turned in a direction in which the engaging portion 17 is inserted and engaged in the lock lever opening 18 so as to be protruded outwardly of the lower cassette half 2, and that the reel lock lever 19 is biased to be turned in a direction in which the one end of the reel lock lever 19 formed as a reel retaining pawl 26 is engaged with teeth 27 on the outer periphery of a flange of the tape reel. The other of the torsion coil springs 21 is provided to the other front side corner on the inner surface of the lower cassette half 2 similarly to the above described coil spring 21.

During the time the tape cassette is not in use, the lid 9 is closed to protect the tape 5 from injury or contamination by, for example, contact with users' fingers. The lock levers 15, 15 are biased in a direction in which the engaging portions 17, 17 are biased to be projected outwardly of the lower cassette half 2, these engaging portions 17, 17 being inserted into the engaging openings 14, 14 formed in the attachment portions 11, 11 to lock the lid 9 against opening incidentally. The reel lock levers 19, 19 are biased by torsion coil springs 21, 21 to cause the reel retaining pawls 26, 26 to be engaged in the teeth 27, 27 to inhibit turning of the tape reels 6, 6 to prevent these tape reels from being turned incidentally by, for example, the force or vibrations exerted from users' fingers to slack the tape 5 wound about the tape reels 6, 6.

Figure 5:
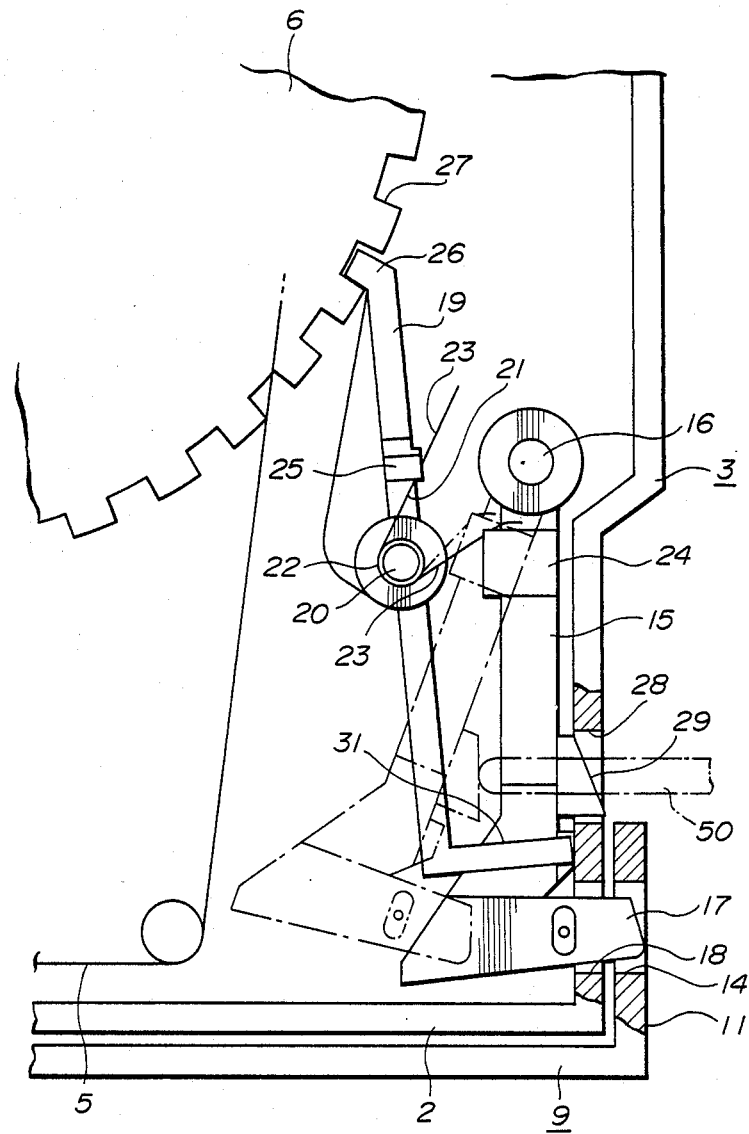
FIG. 5 is a plan view showing essential parts of the lock lever of the tape cassette according to the present invention partly shown in section.

When the tape cassette is mounted to the recording and/or reproducing apparatus, such as a video tape recorder, the tape reel drive shaft is inserted into and engaged with the opening 4, the tape reels 6, 6 being shifted in the cassette 3 towards the upper half 1 to keep the tape reels out of contact with any of the upper and lower cassette halves 1, 2. Since the tape reels 6, 6 are thrusted and biased by the reel retainers 8, 8, the tape reels 6, 6 are firmly thrusted onto the reel drive shaft so as to be turned integrally with the reel drive shaft. The release pins 50, 50 of the recording and/or reproducing apparatus are intruded into the cassette 3 from both sides thereof through release openings 28, 28 formed in the lower cassette half 2 adjacent to the lock lever openings 18, 18. The release pins 50, 50 act on abutting portions 29, 29 that are formed on surfaces of the mid portions of the lock levers 15, 15 facing to side walls of the lower cassette half 2 and that are facing outward from the release openings 28, 28. In this manner, the lock levers 15, 15 are turned inwardly of the cassette 3 against the biasing of the torsion coil springs 21, 21 to cause the engaging portions 17, 17 to be fully intruded into the inside of the cassette 3. These abutting portions 29, 29 are inclined with respect to the moving direction of the release pins 50, 50, as shown in FIG. 5, so that, even if the distance between the release pins 50, 50 and the supporting shaft 16, 16 should be changed at the time of completion of the release operation, the position of the lock levers 15, 15 remains unchanged. The direction and the angle of the abutting portions 29, 29 are selected so that the abutting portions 29, 29 abutted by the release pins 50, 50 make a right angle with the moving direction of the release pins 50, 50 when the release pins 50, 50 terminate their unlocking or release operations. At this time, the engagement between the engaging portions 17, 17 and the openings 14, 14 is released to permit the lid 9 to be opened or closed as desired. The lid opening and closure device of the recording and/or reproducing apparatus causes the lid 9 to be turned and opened for exposing the portion of the tape 5 lying ahead of the cassette 3 towards the outside. When the lid 9 is turned in the opening direction about the supporting shafts 12, 12 as center, the engaging pins 30, 30 protectingly provided to the supporting shafts 12, 12 are turned together with these shafts. These engaging pins 18, 18 act on abutting portions 31, 31 of the reel lock levers 19, 19 provided at the positions facing to the openings 30, 30 to cause the reel lock levers 19, 19 to be turned against the bias of the torsion coil springs 21, 21 to release the engagement between the reel retaining pawls 26, 26 and the teeth 27, 27.

In this state, the tape 5 can be drawn from the front side of the cassette 3 towards the recording and/or reproducing apparatus, while the tap reels 6, 6 can be driven into rotation by the recording and/or reproducing apparatus, so as to permit the operations of recording and reproduction. As described hereinabove the lock levers 15, 15 are kept at the predetermined position without regard to the relative positional deviation between the release pins 50, 50 and the supporting shaft 16, 16, so that the foremost parts of the lock levers 15, 15 are inhibited at all times from contacting with the tape 5.

From the foregoing it is seen that the tape cassette of the present invention provides an arrangement in which the abutting portion of the lock lever abutted by the recording and/or reproducing apparatus is inclined with respect to the direction of movement of the release pin, so that, even when the distance between the release pin and the supporting shaft rotatably supporting the lock lever s changed, the lock lever may be maintained at a predetermined position when the lock lever is actuated for releasing to prevent the foremost part of the lock lever from coming into contact with the tape in the tape cassette to assure the running stability of the tape. This results in improved recording and/or reproducing properties and assurance of the long shelf life of the tape through prevention of tape injury due to contact with the lock lever.

In addition, owing to the running ability and the long shelf life of the tape, the higher precision in the relative positions of the unlock pin and the supporting shaft is not required so strictly as in the conventional device, so that it becomes possible to produce or process the tape cassette and the recording and/or reproducing apparatus more easily and at reduced costs.

It is to be understood that other embodiments and modifications of the preset invention are possible without departing from its spirit or essential character.

What is claimed is:

1. A tape cassette comprising:
   a tape;
   a casing for enclosing said tape therein and having an opening from which said tape can be drawn out;
   a lid consisting of a front plate and a pair of side plates projecting from said front plate, said lid being rotatably supported on said casing at said side plates so as to cover said opening;
   a support shaft mounted within said housing;
   a lock lever rotatably mounted on said support shaft; and
   biasing means for biasing said lock lever so that it is engaged with said lid in a closed state to cause said lid to be in a locked condition, said lock lever having an abutting portion for receiving a release pin movable along an axis so as to release the locked condition of said lid by rotating said lock lever against the biasing force of said biasing means, said axis being at a nominal distance from said support shaft which is subject to a mounting tolerance and said abutting portion having a surface inclined in the moving direction of the release pin so that said lock lever rotates through an angle that is substantially independent of fluctuations in said distance.

2. The tape cassette according to claim 1, wherein said biasing means includes a torsion coil spring.

3. A tape cassette comprising:
   a tape;
   a casing for enclosing said tape therein and having an opening from which said tape can be drawn out;
   a lid consisting of a front plate and a pair of side plates projecting from said front plate, said lid being rotatably supported on said casing at said side plates so as to cover said opening;
   a lock lever rotatably arranged within said housing; and
   biasing means for biasing said lock lever so that it is engaged with said lid in a closed state to cause said lid to be in a locked condition, said lock lever having an abutting portion for receiving a movable release pin so as to release the locked condition of said lid by rotating said lock lever against the biasing force of said biasing means, said abutting portion having a surface inclined in the moving direction of the release pin;
   wherein the inclined surface of said abutting portion is normal to the moving direction of said release pin when the rotation of said lock lever by said release pi is terminated.

4. A tape cassette comprising:
   a tape;
   a casing for enclosing said tape therein and having an opening from which said tape can be drawn out;
   a lid consisting of a front plate and a pair of side plates projecting from said front plate, said lid being rotatably supported on said casing at said side plate so as to cover said opening;
   a lock lever rotatably arranged within said housing; and
   biasing means for biasing said lock lever so that it is engaged with said lid in a closed state to cause said lid to be in a locked condition, said lock lever having an abutting portion for receiving a movable release pin so as to release the locked condition of said lid by rotating said lock lever against the biasing force of said biasing means, aid abutting portion having a surface inclined in the moving direction of the release pin;

wherein said casing includes a lower half having side walls provided with a lock lever openings, one of the side walls being further provided with a release opening into which said release pin is intrudable, said lid also being provided with engaging openings, said lock lever having a base portion, and a foremost engaging portion provided so as to be engageable with said lid, said abutting portion being provided so as to project from the mid portion of one side of said lock lever; and further comprising a supporting shaft mounted upright in the lower half of said casing, said base portion of said lock lever being rotatably supported by said supporting shaft, said biasing means biasing and turning said lock lever so that said abutting portion faces the release opening in said side wall, the engaging portion of said lock lever being insertable into and engageable with the lock lever openings in the lower half of said casing and further engageable with the openings in said lid.

5. A tape cassette comprising:

a tape a casing for enclosing said tape therein and having an opening from which said tape can be drawn out;

a lid consisting of a front plate and a pair of side plates projecting from said front plate, said lid being rotatably supported on said casing at said side plates so as to cover said opening;

a lock lever rotatably arranged within said housing; and biasing means for biasing said lock lever so that it is engaged with said lid in a closed state to cause said lid to be in a locked condition, said lock lever having an abutting portion for receiving a movable release pin so as to release the locked condition of said lid by rotating said lock lever against the biasing force of said biasing means, said abutting portion having a surface inclined in the moving direction of the release pin;

and further comprising a pair of tape reels, about which said tape is wound, rotationally supported in said casing, and a reel lever provided in said casing so as to control said pair of tape reels, said biasing means being adapted so as to simultaneously bias said lock lever and said reel lock lever.

6. A tape cassette comprising:

a tape;

a casing for enclosing said tape therein and having an opening from which said tape can be drawn out;

a lid consisting of a front plate and a pair of side plates projecting from said front plate, said lid being rotatably supported on said casing at said side plates so as to cover said opening;

a lock lever rotatably arranged within said housing; and biasing means for biasing said lock lever so that it is engaged with said lid in a closed state to cause said lid to be in a locked condition, said lock lever having an abutting portion for receiving a movable release pin so as to release the locked condition of said lid by rotating said lock lever against the biasing force of said biasing means, said abutting portion having a surface inclined in the moving direction of the release pin;

wherein said biasing means includes a torsion coil spring;

wherein said lid has an engaging opening; and further comprising a circumferentially toothed reel rotatably supported in said casing and about which said tape is wound; a reel lock lever having an end with a reel retaining pawl and being provided in said casing so as to control rotation of said reel; a supporting shaft provided so as to rotatably support said reel lock lever; said torsion coil spring being mounted on said supporting shaft and having a first arm provided so as to be retained by said reel lock lever so that said reel lock lever is biased so as to be turned in a direction in which said reel retaining pawl is engaged with said tape reel teeth, said torsion coil spring having a second arm retained by said lock lever so as to bias said lock lever in a direction in which a terminal engaging portion of said lock lever is engageable with the engaging opening in said lid.

* * * * *

UNITED STATES PATENT AND TRADEMARK OFFICE
CERTIFICATE OF CORRECTION

PATENT NO. : 4,824,044
DATED : April 25, 1989
INVENTOR(S) : Takashi Oogi

It is certified that error appears in the above-identified patent and that said Letters Patent is hereby corrected as shown below:

In the Abstract, line 9, after "apparatus" insert --,--.
Column 2, line 15, change "mar" to --mark--;
        line 52, change "/" to --,--.

Column 5, line 27, change "18, 18" to --30, 30--;
        line 29, change "30, 30" to --18, 18--;
        line 35, change "tap" to --tape--;
        line 38, after "hereinabove" insert --,--;
        line 39, change "position" to --positions--;
        line 53, change "s" to --is--;
        line 62, change "ability" to --stability--.
Column 6, line 2, change "preset" to --present--.

IN CLAIMS:

Column 6, line 53, change "pi" to --pin--.
Column 7, line 2, change "aid" to --said--;
        line 6, delete "a";
        line 26, after "tape" insert --;--.

UNITED STATES PATENT AND TRADEMARK OFFICE
CERTIFICATE OF CORRECTION

PATENT NO. : 4,824,044
DATED : April 25, 1989
INVENTOR(S) : Takashi Oogi

It is certified that error appears in the above-identified patent and that said Letters Patent is hereby corrected as shown below:

Column 8, line 1, after "reel" insert --lock--.

Signed and Sealed this

Twenty-first Day of November, 1989

Attest:

JEFFREY M. SAMUELS

*Attesting Officer*    *Acting Commissioner of Patents and Trademarks*